No. 647,556. Patented Apr. 17, 1900.
S. A. CRONE.
DUST GUARD.
(Application filed Sept. 21, 1899.)
(No Model.)
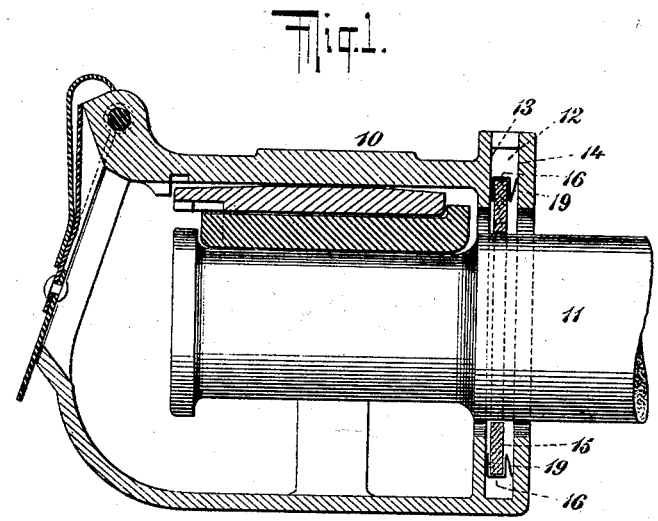
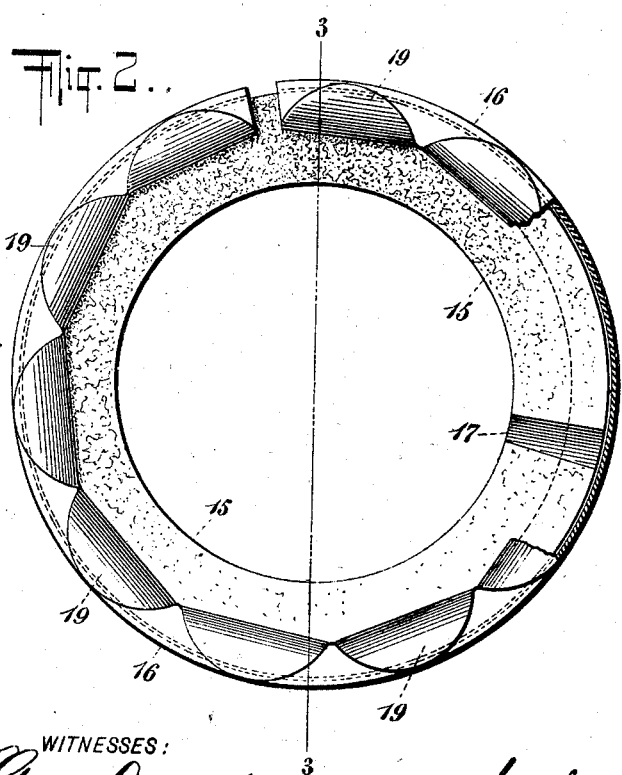
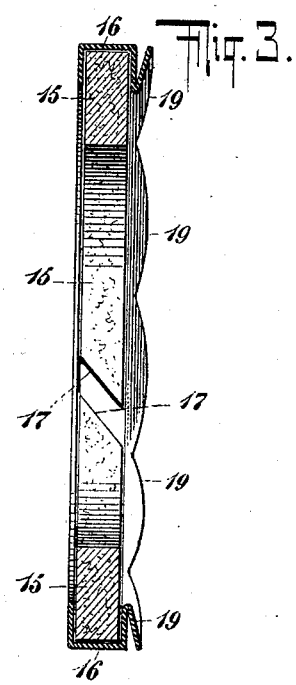
WITNESSES:
Gustav Dieterich.
John Kehlenbeck.
INVENTOR
Seth A. Crone.
BY
Chas. C. Gill
ATTORNEY

UNITED STATES PATENT OFFICE.

SETH A. CRONE, OF NEW YORK, N. Y.

DUST-GUARD.

SPECIFICATION forming part of Letters Patent No. 647,556, dated April 17, 1900.

Application filed September 21, 1899. Serial No. 731,165. (No model.)

*To all whom it may concern:*

Be it known that I, SETH A. CRONE, a citizen of the United States, and a resident of New York, in the county of New York and State of New York, have invented certain new and useful Improvements in Dust-Guards for Car-Axle Journal-Boxes, of which the following is a specification.

The invention relates to improvements in dust-guards for journal-boxes; and it consists in the novel features and combinations of parts hereinafter described, and particularly pointed out in the claims.

In its preferred embodiment my invention consists of a split ring of asbestos and a circular casing inclosing the outer edges of said ring and adapted to bear with a moderate amount of pressure upon said edges, so as to maintain the inner edges of the asbestos ring in constant contact with the surfaces of the car-axle. The dust-guard, comprising the asbestos ring and the casing containing and holding the same, will be introduced into the usual dust-guard space provided at the inner end of the journal-box, in which space the said circular casing will be rather firmly held by reason of the yielding contact of a portion of same with the walls of said space.

While I prefer the employment of asbestos for the formation of the split ring to encircle the car-axle, I do not in every instance limit my invention to the employment of such substance. The asbestos ring is, however, very desirable, owing to its wearing qualities and the fact that it is both a non-conductor of heat and would withstand the influence of a hot box.

The invention will be fully understood from the detailed description hereinafter presented, reference being had to the accompanying drawings, in which—

Figure 1 is a central vertical longitudinal section through a journal-box equipped with a dust-guard constructed in accordance with and embodying my invention. Fig. 2 is an enlarged face-view, partly broken away and partly in section, of a dust-guard embracing my invention; and Fig. 3 is a central vertical section of same on the dotted line 3 3 of Fig. 2.

In the drawings, 10 denotes a usual form of car-axle journal-box, and 11 a portion of the car-axle, shown in position within said box. The journal-box 10 is provided at its inner end with the vertical dust-guard space 12, formed between the vertical walls 13 14, through suitable openings in which walls the car-axle 11 passes and into which space 12 is placed the dust-guard of my invention to encircle said axle and prevent the entrance of dust or other foreign matter to the journal-box.

The dust-guard is illustrated in position in Fig. 1, but is more clearly illustrated in Figs. 2 and 3, in which it may be seen that the dust-guard comprises the split ring 15 and the casing 16, which incloses said ring at its outer edges and is preferably formed of sheet metal. The split ring 15 preferably has its ends correspondingly beveled, as illustrated at 17 17 in Fig. 3, so that said ends may overlap one another when the ring is expanded to admit the axle 11. The circular casing 16 is formed with ends which are free of one another, as indicated in Fig. 2, in order that said casing may, correspondingly with the ring 15, be expanded upon the entrance of the axle 11 through the dust-guard and into the journal-box. In Figs. 2 and 3 the ring 15 and casing 16 are illustrated in their expanded condition, this being the condition said parts will possess when in operative position upon the axle 11. It is to be understood, however, that there is sufficient tension or elasticity in the ring 15 and casing 16 to cause their joints to close together if left unrestrained by the car-axle, and it is this tension or elasticity in said ring and casing that I make use of to keep the ring 15 in contact with the surfaces of the axle 11 during the wearing off of the inner edges of said ring by the friction of the car-axle against the same. The ring 15 may of course be made to snugly fit the car-axle and be formed in one continuous piece of material; but the objection to thus forming the ring 15 would be that it would not be so lasting, since there would be no means then present for compensating for the wear of the car-axle against the inner edges of the ring. When, therefore, the ring 15 is constructed in the form of a split ring and is under an initial condition of expansion when it first receives the car-axle, the said ring will not only snugly fit upon the car-axle, but will maintain its efficiency until worn off along its inner edges to a considerable extent. The casing 16 also being in the form of a split ring will maintain a tension or pressure upon the periphery of the ring 15 and compel said ring to closely fit upon the car-axle. In the absence of any special resiliency in the ring 15 the tension of the casing 16 when its ends are moved apart will nevertheless compel the ring 15 to maintain its close-fitting condition upon the axle 11.

The casing 16 incloses the outer edge and the outer portions of the sides of the ring 15, and possesses a suitable number of outwardly-turned lips 19, which, when the dust-guard is in position in the space 12 of the journal-box, will engage the wall 14 at one side of said space. The diameter of the dust-guard, taken through the outer edge of the lips 19, is slightly greater than the diameter of the space 12, and hence when the dust-guard is introduced into the space 12 it will somewhat tightly fit said space, the lips 19 yielding as spring-lips to admit of the entrance of the dust-guard into said space and operating to prevent any rattling about of the dust-guard or any undue rotation of the same with the car-axle. The invention is not limited to the use of any special number of the lips 19, it only being necessary that enough of the lips 19 be made use of to evenly and somewhat firmly bind the dust-guard casing or frame 16 in position within the space 12.

The split ring 15, while closely fitting the car-axle, will be held by its casing or frame 16 with sufficient firmness to prevent its undue rotation therein. There are greater frictional surfaces between the ring 15 and its casing than there are between the ring 15 and the axle 11, and thus without exerting any great binding force on the ring 15 the said casing may readily prevent the same from turning freely with the said axle. In addition it may be said that the inner edges of the ring 15 will become oiled and wear smooth, so that there will be only a minimum degree of friction generated by the car-axle. It is the intention, however, not to have the parts of the dust-guard bind against one another or the surfaces of the axle and box very tightly, since it is desirable that the dust-guard, and more especially the ring 15, shall turn occasionally, as when the car is going around curves, so that said ring may not receive all its wear in one place.

The ring 15 will prove to be more satisfactory if made wholly of asbestos but said ring may of course be made only partly of asbestos, the latter substance preferably predominating, especially adjacent to the car-axle. A less-satisfactory split ring 15 could also be made of leather or felt or other material, and hence I do not limit the invention in every instance to the use of asbestos.

The dust-guard hereinbefore described is light and efficient and both simple and inexpensive of construction.

The openings in the walls 13 and 14 are usually elliptical in outline, and hence the dust-guard may be given a corresponding outline, the invention not being limited to any special outline for the exterior edges of the guard.

What I claim as my invention, and desire to secure by Letters Patent, is—

1. The dust-guard for car-axle boxes comprising the split ring 15 in frictional contact with the car-axle, and the split casing inclosing and in frictional engagement with the outer edges of said ring, as well as being in frictional contact with the walls of the axle-box, said ring being of substantial proportions so as to form the dust-guard proper, and said casing being adapted to turn on the car-axle and within the box; substantially as set forth.

2. The dust-guard for car-axle boxes comprising the split ring 15 adapted to encircle the car-axle, and the casing 16 engaging the outer side portions and edges of said ring and having at one side the outwardly-turned spring-lips 19; substantially as set forth.

Signed at New York, in the county of New York and State of New York, this 20th day of September, A. D. 1899.

SETH A. CRONE.

Witnesses:
CHAS. C. GILL,
GUNDER GUNDERSON.